United States Patent [19]

Keech

[11] Patent Number: 4,631,001

[45] Date of Patent: Dec. 23, 1986

[54] T-FITTING WITH ONE WAY VALVE AND WATER LEVEL SENSOR FOR A SUMP APPARATUS

[75] Inventor: David W. Keech, Bryan, Ohio

[73] Assignee: The Scott & Fetzer Co., Fort Wayne, Ind.

[21] Appl. No.: 764,868

[22] Filed: Aug. 9, 1985

[51] Int. Cl.⁴ .................. F04B 41/06; F04B 49/00
[52] U.S. Cl. ........................... 417/3; 417/7; 417/36; 137/515.5; 137/855
[58] Field of Search .................. 137/855, 515.5; 417/2–7, 36

[56] References Cited

U.S. PATENT DOCUMENTS

| | | | |
|---|---|---|---|
| 3,066,696 | 12/1962 | Hansley | 137/855 |
| 3,514,231 | 5/1970 | Bolden | 137/855 |
| 3,593,732 | 7/1971 | Holscher | 137/855 |
| 3,626,980 | 12/1971 | Suenssen | 137/855 |
| 3,726,606 | 4/1973 | Peters | 417/7 |
| 3,788,047 | 1/1974 | Douthitt | 137/855 |
| 3,814,124 | 9/1974 | Bell | 137/855 |
| 4,222,711 | 9/1980 | Mayer | 417/7 |
| 4,388,043 | 6/1983 | Priess | 417/36 |

Primary Examiner—Carlton R. Croyle
Assistant Examiner—Paul F. Neils
Attorney, Agent, or Firm—Jeffers, Irish & Hoffman

[57] ABSTRACT

A sump pump assembly having a primary sump pump and a secondary sump pump and including a T-fitting for connecting together the outlets of the primary sump pump and the secondary sump pump to a common exhaust. The T-fitting contains a one-way valve on the secondary pump outlet connection and a fastening means for a water level sensing device.

27 Claims, 6 Drawing Figures 4,631,001

T-FITTING WITH ONE WAY VALVE AND WATER LEVEL SENSOR FOR A SUMP APPARATUS

BACKGROUND OF THE INVENTION

This invention relates generally to a sump pump system having a primary sump pump and an emergency sump that takes over in the event the primary sump pump fails. More specifically, the invention is directed to a sump pump system having a connecting means in a sump system for connecting the outlet of the primary sump pump and the secondary sump pump, located above said primary pump, to a common exhaust whereby the connecting means is a T-fitting having a one-way valve on the end thereof connected to the secondary pump and having a means for fastening a water level sensing device on the exterior surface thereof.

In recent times, flooding has become common in urban areas due to many reasons ranging from faulty construction to decreasing ground area in urban locations wherein the amount of water can be soaked up is reduced. As a result, homeowners are requiring reliable sump systems which can adequately pump accumulating water out of basements and crawl spaces. Accordingly, many homeowners have turned to secondary sump pump systems similar to that disclosed in U.S. Pat. No. 3,726,606 wherein a secondary pump is incorporated in a sump system such that it is energized when the primary pump cannot keep up with the incoming water. Further, the secondary pump can be made to run on a direct current motor such that it can be energized by batteries when the primary pump fails due to a power shortage. Naturally, because of the tremendous amount of damage that can be done by water seepage, and because flood and water insurance is comparatively costly, an increasing number of homeowners are installing sump systems with secondary pumps.

Installing a secondary pump system, however, for many homeowners is difficult due to the pipe connections required and due to the costs involved. The check valve and other piping required between the secondary pump and the T-fitting are generally costly and difficult to install. Further, check valves presently used in this application generally somewhat restrain flow creating resistance and, thus, diminish full potential use of the secondary pump and the batteries powering it. Further yet, installation is made more difficult because an adequate method for mounting the water level sensing device is not provided. Installing a water level sensing device on the side of an existing sump hole is often times very difficult, if not impossible, because the sides of a sump hole are generally made of concrete thereby requiring special tools and skill for installation.

SUMMARY OF THE INVENTION

It is the principal object of the invention to overcome the above-discussed disadvantages associated with earlier devices. It is also an object of the invention to provide a less costly, easily installable assembly for installing a secondary sump pump, to be used in conjunction with a primary sump pump, in a sump hole, and further utilizing a common exhaust for both the primary and secondary sump pumps.

It is also an object of the invention to provide a structure for fluidly connecting a secondary pump in a pump system whereby water flow friction is minimized, to provide an easily installable one-way flow valve and provide a convenient fastening means for fastening a water level sensor device.

In one form of the invention, the invention is directed to a T-fitting in a sump pump system having a primary and secondary back up pump wherein the T-fitting includes a primary pump connecting end and a secondary pump connecting end. The T-fitting fluidly connects the primary pump and the secondary pump outlets to a common exhaust. A one-way valve is positioned within the T-fitting and a secondary pump connecting end so as to be substantially horizontally disposed.

In another form thereof, the invention is directed to a T-fitting and a sump system having a primary and a secondary backup pump wherein the T-fitting fluidly connects the primary pump and the secondary pump outlets to a common exhaust. The T-fitting has a cylindrically shaped connecting ends and the secondary pump connecting end is substantially horizontally disposed. A fastening means is located on the exterior surface of the T-fitting for fastening thereon a water level sensor means for electrically sensing the water level. A one-way valve is positioned within the secondary pump connecting end.

Other objects and advantages of the invention will become apparent from the following specification taken in conjunction with the accompanying drawings.

DESCRIPTION OF A SPECIFIC EMBODIMENT

Figure 1:
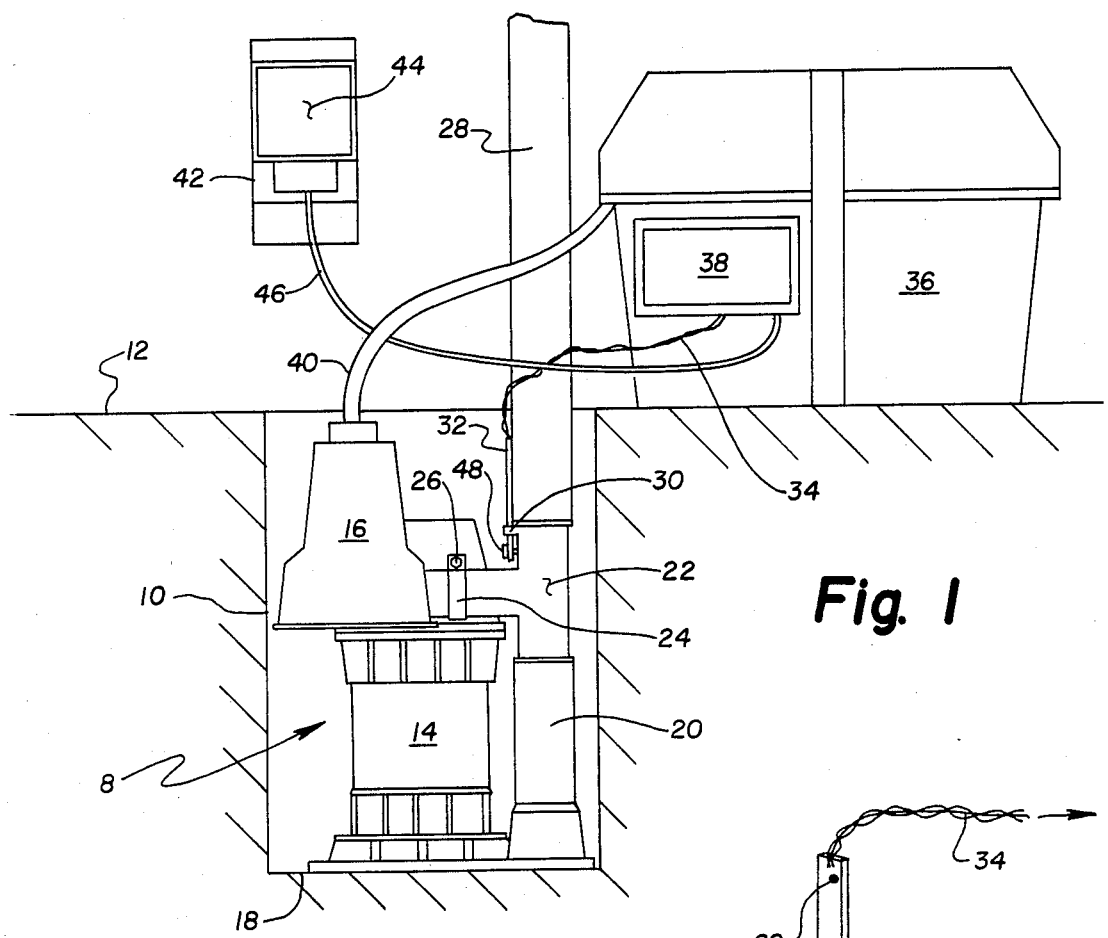
FIG. 1 is a sectional view of a sump hole showing the device completely assembled with a primary and secondary pump connected by the T-fitting to a common exhaust, a water level sensing device mounted on said T-fitting and, outside of the sump hole, showing a battery pack and an alternating current source.

As shown in the drawings, the device is contemplated to be used in a sump pump assembly for connecting the primary and secondary pump outlets to a common exhaust while also incorporating a one-way flapper valve within the T-fitting and a fastening means for a water level sensing device exterior to the T-fitting.

More specifically, referring to FIG. 1, there is a sump assembly generally designated by arrow 8 within sump hole 10 located vertically below floor 12. The sump assembly 8 within sump hole 10 rests upon sump hole floor 18. Sump assembly 8 includes primary sump pump 14 connected to an alternating current source (not shown) and a secondary sump pump 16 connected to a direct current source via secondary pump power wires 40. Secondary sump pump power wires are connected to battery pack 36 having necessary control switches and mode indicators (not shown) within control panel 38. Battery pack 36 is kept fully charged by receiving AC power from an ordinary receptacle 42 through plug 44 and extension cord 46.

Figure 2:
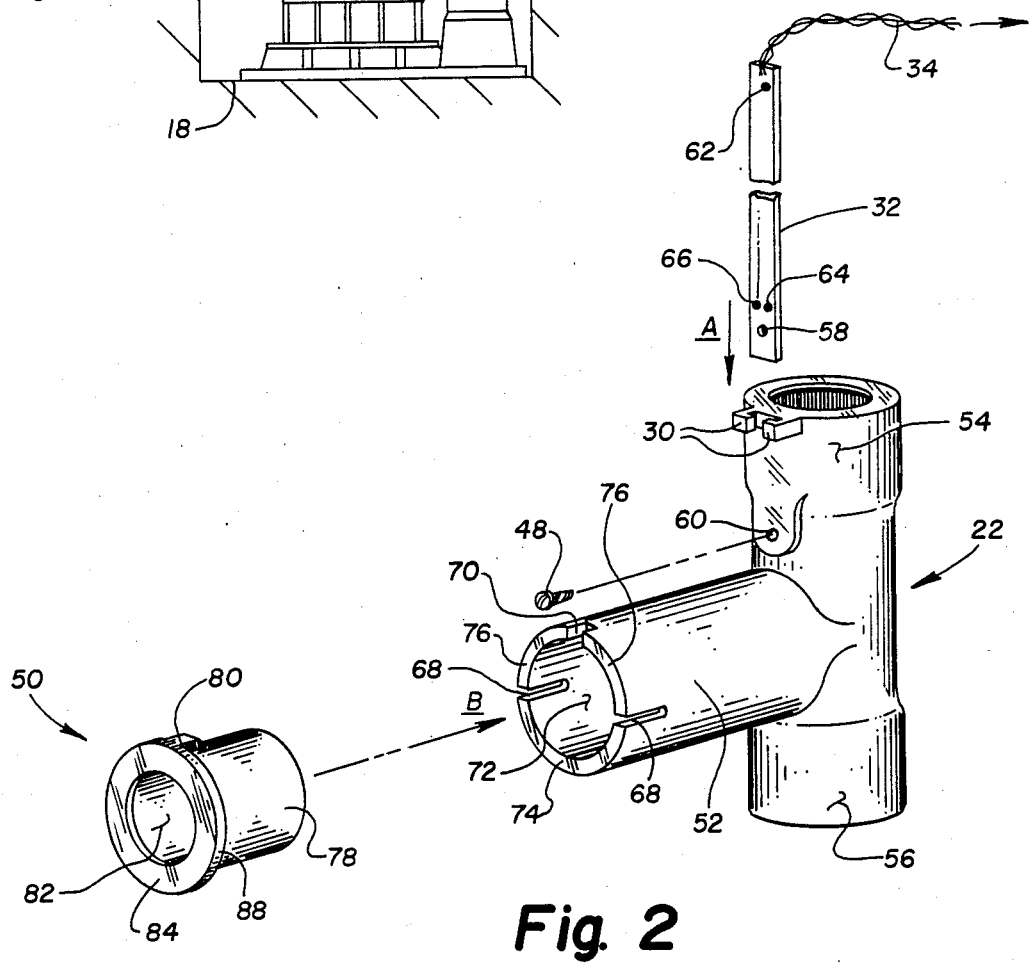
FIG. 2 is an exploded, perspective view showing the one-way flapper valve, the T-fitting and the water level sensing device.

Referring now to both FIGS. 1 and 2, water level sensor 32 is mounted upon T-fitting 22 by sliding it, in the direction indicated by arrow A, through L-shaped arms 30 extending outwardly from the exhaust connecting end 54 and fastening it thereupon by inserting T-fitting screw 48 through sensor hole 58 and securing said T-fitting screw 48 within screw hole 60. Water level sensor 32 is a common flat, rectangular circuitboard having conductive points 62, 64 and 66 thereon, each connected to and corresponding to a wire within a group of water level sensor wires 34 leading and connected to battery pack 36.

Electrical circuitry within control panel 38 connected to water level sensor wires 34 is capable of sensing a short circuit occurring between conductive point 62 and 64 and between conductive point 66 and 64. Thus, if the water level within sump hole 10 rises, submerging conductive points 64 and 62, the water acting as a conductor short circuits conductive points 62 and 64. The short circuit is sensed by the electrical circuitry within control panel 38 which in turn energizes secondary sump pump 16 via secondary sump pump power wires 40. The electrical circuitry continues to energize secondary sump pump 16 as long as a short circuit is sensed across conductive points 66 and 64. Therefore, when the water level within sump hole 10 drops below conductive points 66 and 64, the short circuit between those two points, occurring through the water, is eliminated and, thus, the electrical circuitry is triggered to deenergize secondary sump pump 16.

This method of triggering the "on" and "off" modes of secondary pump 16 by sensing current flow between the above designated conductive points will work with direct current so long as minerals and other impurities exist in the water so that the water can act as a conductor. Using direct current, has disadvantages in that if the water has no impurities within it, a short circuit cannot be created and thus the water level cannot be sensed by the electronic circuitry. Further, direct current causes impurities to build up on the conductive points thereby also stopping a short circuit from occurring. Thus, the preferred embodiment requires that an alternating current source at conductive point 64 transmit an electromagnetic wave which can be sensed by conductive points 62 and 66. The electronic circuitry senses the capacitance between points 62 and 64 and between points 66 and 64 and turns secondary pump 16 "on" and "off" accordingly. By using alternating current, the water level can be sensed whether or not impurities exist in the water and, further, impurities do not build up on the conductive points.

Under normal operation, primary sump pump 14 pumps water which accumulates in sump hole 10 through the primary pump outlet 20 leading to T-fitting 22 and finally out through the common exhaust 28. The primary pump outlet 20 is connected to the primary pump connecting end 56 of T-fitting 22 by commonly known PVC pipe connecting means such as gluing and fitting together. Common exhaust pipe 28 is connected to the exhaust connecting end 54 of T-fitting 22 in the same manner as primary pump outlet 20 is connected to T-fitting 22.

As water is forced out through common exhaust 28 by the primary sump pump 14, the water is restrained from exiting the T-fitting through the secondary pump connecting end 52 by the one-way flow valve 50 which is inserted inside of secondary pump connecting end 52 as indicated by arrow B. Secondary connecting end 52 is generally cylindrically shaped and has two axially disposed slots 68 located at the end thereof. Said slots 68 split up the outer portion of the secondary pump connecting end into a lower radial periphery 74 and an upper radial periphery 76. Thus, the lower radial periphery 74 and the upper radial periphery 76 become moderately flexible with respect to each other and the remaining portion of secondary pump connecting end 52. Upper radial periphery 76 has an axial notch 70 extending therethrough so as to receive the one-way flow valve protrusion 80 when said one-way flow valve 50 is inserted into secondary pump connecting end 52 as indicated by arrow B. The notch 70 and valve protrusion 30 act together to prevent radial movement of the one-way flow valve 50 within secondary pump connection end 52. The cooperation between protrusion 80 and notch 70 also facilitates the accurate and consistent alignment of the flow valve 50 with T-fitting 22.

Referring generally to FIGS. 2 through 6, one-way flow valve 50 is a single injected molded piece made of nitrile rubber having a cylindrical valve body 78 which is slightly smaller than and fits tightly against the secondary pump connecting end cylinder interior 72. In the back portion of the cylindrical valve body 78 there exists a lip consisting primarily of lip back portion 84, lip outer periphery 88 and lip seat 86. When the one-way valve 50 is inserted into the secondary pump connecting end 52, said lip seat 86 rests tightly against secondary pump connecting end upper and lower radial peripheries 76 and 74. In this fashion, said lip keeps the one-way flow valve 50 from slipping and traveling axially into secondary pump connecting end 52 as water is forced through the one-way valve cylindrical channel 82.

One-way flow valve 50 has a flapper cap in the front thereof generally designated 104. Flapper cap 104 has a front portion 90 and a back seat portion 92. Flapper cap 104 is connected by hinge 98, which is also made of nitrile rubber, to valve seat 96 located at the front portion of cylindrical valve body 78. Flapper cap hinge 98 is comparatively thin as shown in FIG. 5 and has notched ends 94 as shown in FIG. 3 so that flapper cap 104 can easily be moved by the water pressures created thereupon.

When connecting the secondary pump 16 to the T-fitting 22, one-way flow valve 50 is first inserted into the secondary pump connecting end 52 so that valve protrusion 80 is received within notch 70 and lip seat 86 rests against secondary pump connecting end upper and lower radial peripheries 76 and 74. Cylindrical valve body 78 is thus also resting against secondary pump connecting end cylindrical interior 72. The secondary pump outlet (not shown) is then inserted into the one-way valve cylindrical channel 82. The secondary pump outlet must not touch the seat back portion 102 so as to not interfere with valve seat 96 and overall proper valving. The secondary pump outlet made of substantially rigid material is cylindrical shaped and fits snuggly within valve cylindrical channel 82. Thereafter, circular clamp 24 (FIG. 1) is placed around the secondary pump connecting end close to its outer radial periphery and tightened thereupon using clamp bolt 26. The radial forces created by circular clamp 24 force the flexible upper and lower radial peripheries 76 and 74, respectively, radially inward so that the secondary pump connecting end cylindrical interior 72 is frictionally tightened against cylindrical valve body 78 and valve cylindrical channel 82 is frictionally tightened against the secondary pump outlet (not shown). Thus, the secondary pump outlet, one-way valve 50, and T-fitting 22 are fastened together preventing axial movement with respect to each other, and further also, creating a seal between all three parts so that water does not leak therethrough.

Figure 3:
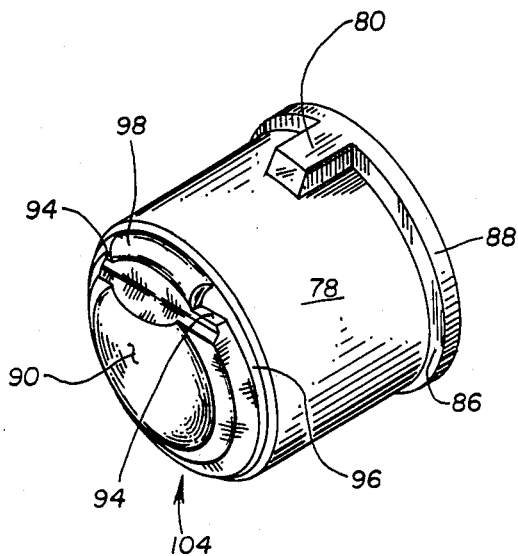
FIG. 3 is a front perspective view of the one-way flapper valve showing the protrusion on the back side and the flapper cap along with the hinge means on the front side.
Figure 4:
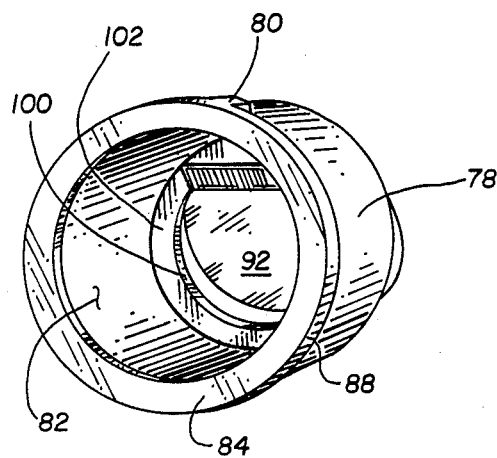
FIG. 4 is a back perspective view of the one-way flapper valve showing its cylindrical opening therethrough and the retaining lip.
Figure 5:
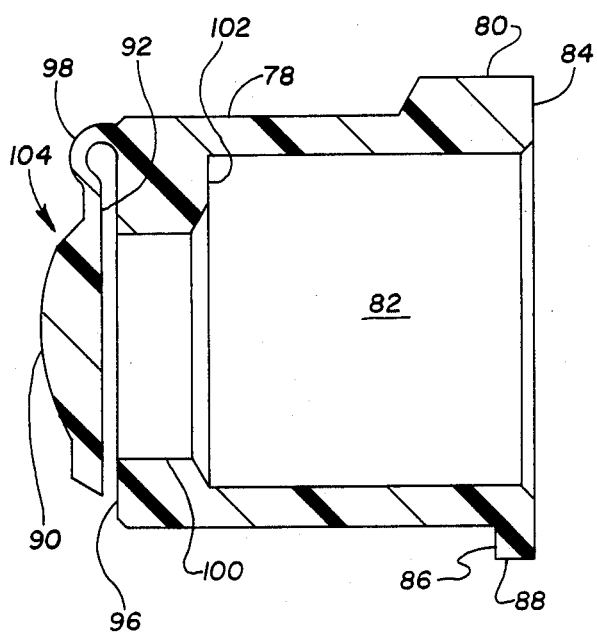
FIG. 5 is a cross-sectional view of the one-way flapper valve.
Figure 6:
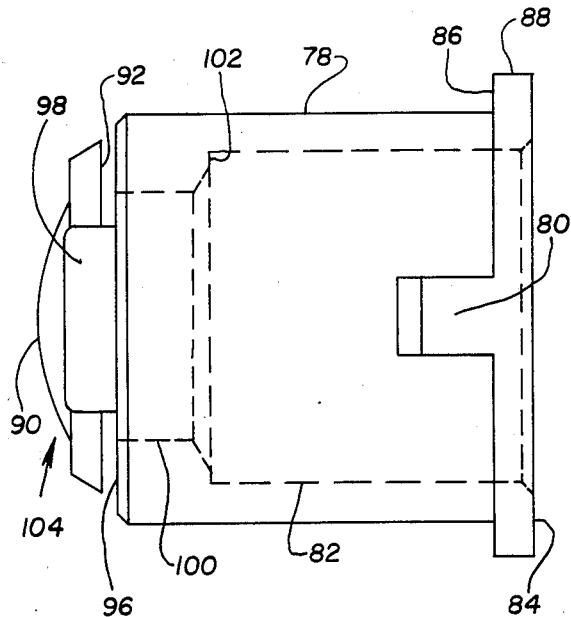
FIG. 6 is a top plan view of the one-way flapper valve showing the opening therethrough with hidden lines.

In operation, when neither the primary pump 14 nor the secondary pump 16 are energized, flapper cap 104 hangs downwardly as shown in FIGS. 3 and 5 due to gravitational pull. Hinge 98 is always kept vertically above flapper cap 104 due to valve protrusion 80, which is received in notch 70 restricting radial movement by one-way valve 50. When the primary pump 14 is energized and water is pumped through T-fitting 22, water pressure is provided on the flapper cap front portion 90 thereby pushing flapper cap 104 back toward valve seat 96 and thereby creating a seal between flapper cap seat 92 and valve seat 96. It has been found that the specific embodiment herein disclosed requires two feet of head so as to substantially seal.

When the water level sensor, along with its electronic circuitry, has determined that the water level has risen to a level wherein point 62 is covered by water, secondary pump 16 is energized thus creating water pressure against flapper cap seat 92. Thereafter, so long as the pressure created on flapper cap seat 92 is greater than the pressure created on flapper cap front 90, flapper cap 104 swings forward and upwardly allowing the water to flow therethrough. Thus, water pumped by the secondary pump 16 will flow through the secondary pump outlet (not shown) through the valve cylindrical channel 82 and seat opening 100 and then enter secondary pump connecting end 52 leading to common exhaust 28 via T-fitting 22. It can be appreciated that the hinge 98 displaces cap 104 to a sufficient degree so that water flow friction is minimized as the water is pumped through cylindrical channel 82 and out of seat opening 100. When the primary pump 14 is not energized, to prevent water being pumped by secondary pump 16 from traveling downwardly through primary pump outlet 20 and into sump hole 10, a common check valve or a flapper cap one-way flow valve as disclosed herein may be utilized within the primary pump outlet or within the primary pump connecting end 56.

As can be appreciated, applicant has provided an emergency sump pump assembly consisting of a primary sump pump and a secondary sump pump which are fluidly connected by a T-fitting to a common exhaust. The operation of the assembly can be summarized in that the primary sump pump is designed to maintain the fluid in the sump between two predetermined levels. The highest one of these predetermined levels is below the level at which the secondary sump pump would become energized. In the event the primary sump pump malfunctions or is unable to pump fluid from the sump at a sufficient rate, the fluid level will rise to a predetermined high level at which time the secondary sump pump will be energized. The secondary sump pump will then pump water from the sump through the T-fitting and out the common exhaust until it reaches a predetermined low level, at which time the secondary sump pump will become deenergized. As can be appreciated, the existence of the secondary sump pump provides a back up for the primary sump pump in the event it fails or is unable to maintain an adequate output flow.

It should be further mentioned that although an electronic water sensing device has been discussed, it would also be possible to utilize a conventional float switch device wherein a mercury-type switch is contained within a float connected to the secondary sump pump switch by an arm and this structure designed so that the secondary sump pump can maintain the fluid level between two predetermined levels as discussed earlier.

While the invention has been described as having a specific embodiment, it will be understood that it is capable of further modification. This application is, therefore, intended to cover any variations, uses or adaptations of the invention following the general principles thereof and including such departures from the present disclosure as come within known or customary practice in the art to which this invention pertains and fall within the limits of the appended claims.

What is claimed is:

1. In a sump system having a primary and a secondary backup pump, an apparatus comprising:
   a T-fitting fluidly connecting the primary pump and secondary pump outlets to a common exhaust, said T-fitting having cylindrically shaped connecting ends, said secondary pump cylindrically shaped connecting end substantially horizontally disposed,
   a fastening means on the exterior surface of said T-fitting for fastening thereon a water level sensor means for electrically sensing the water level to in turn energize the secondary pump and
   a one-way valve within said secondary pump cylindrically shaped connecting end.

2. The sump system of claim 1 wherein the fastening means comprises two L-shaped arms facing each other and mounted on the outer cylindrical surface substantially near said T-fitting exhaust outlet generally vertically above said secondary pump connecting end and one hole substantially verically below said arms and vertically above said secondary pump connecting end for receiving a fastening screw therein whereby said L-shaped arms and said screw retain upon said T-fitting said sensor means.

3. The sump system of claim 1 wherein the secondary pump connecting end of said T-fitting has a notch disposed within its outermost radial periphery and two longitudinal slots longitudinally shorter than said one-way valve, each slot located radially substantially 90° in opposite radial direction from said notch whereby said longitudinal slots make the secondary pump connecting end radially flexible and whereby said connecting end can be forcibly secured upon said one-way valve.

4. The sump system of claim 3 wherein the one-way valve is a single rubber injection molded piece comprising a cylindrical body having front and back radial peripheral surfaces and a radial outer surface slightly smaller than the inner cylindrical surface of the secondary pump connecting end,
   a radial lip near the cylindrical body back radial peripheral surface extending radially outward from the exterior surface of said cylindrical body whereby when said one-way valve is placed within said secondary pump connecting end of said T-fitting said radial lip is seated against the peripheral edge of the secondary pump connecting end and holds the one-way valve from travelling longitudinally further into said secondary pump connecting end, a protrusion on the exterior surface of said cylindrical body near the back radial periphery to be received by said notch, a flapper cap in front of said front peripheral surface of said cylindrical body larger than the radially inner cylindrical opening of said cylindrical valve body whereby said flapper cap can be seated on the front radial periphery of said cylinder body and thereby close off the cylindrical inner opening of said cylindrical body, a hinging means for hingedly connecting said flapper cap onto said cylindrical body front radial peripheral surface including a radial shaped rubber portion having a notch cut out on both sides thereof and near the flapper cap connection whereby the flapper cap can more easily open and close.

5. The sump system of claim 4 wherein said secondary pump outlet is generally cylindrically shaped and inserted inside of said cylindrical valve body extending into said cylindrical valve body not further than said front radial peripheral surface whereby said rubber cylindrical valve body seals from fluid leakage a formed cylindrical conduit extending from the secondary pump outlet travelling through the valve cylindrical body and into said T-fitting.

6. The sump system of claim 5 further comprising a clamping means for clamping and securing together said secondary pump T-fitting connecting end upon said one-way valve and upon said secondary pump outlet whereby longitudinal movement of the connecting end, the one-way valve and the secondary pump outlet is restrained and a seal against leakage is created thereby.

7. In a sump system having a primary and a secondary backup pump, an article comprising:

a T-fitting having a primary pump connecting end and a secondary pump connecting end, said T-fitting fluidly connecting the primary pump and the secondary pump outlets to a common exhaust, a one-way valve positioned within said T-fitting in the secondary pump connecting end so as to be substantially horizontally disposed and a slot on said secondary pump connecting end starting at the outermost radial periphery and extending axially towards said T-fitting, whereby said slot makes the outermost periphery of said secondary pump connecting end radially flexible.

8. The sump system of claim 7 further comprising a fastening means on the exterior surface of said T-fitting for fastening thereon a water level sensor means for electrically sensing the water level to in turn energize the secondary pump.

9. The sump system of claim 8 wherein the connecting ends of said T-fitting are generally cylindrically shaped and the fastening means comprises two L-shaped arms facing each other and mounted on the outer cylindrical surface of said T-fitting exhaust connecting end substantially near the outermost periphery of said exhaust connecting end, and one hole, substantially vertically below said arms, for receiving a screw therein whereby said L-shaped arms and said screw retain upon said T-fitting said sensor means.

10. The sump system of claim 7 wherein said T-fitting connecting ends are generally cylindrically shaped and the secondary pump cylindrical connecting end having its axis substantially horizontally disposed, said secondary pump cylindrical connecting end comprising a notch within its outermost radial periphery.

11. The pump system of claim 10 further comprising a second slot on said secondary pump cylindrical end starting at the outermost radial periphery and extending axially toward said T-fitting, said slots located substantially 180° radially apart from each other and substantially 90° radially distant from said notch, whereby said slots make the outermost periphery of said secondary pump cylindrical end radially flexible.

12. The sump system of claim 1 wherein the one-way valve is a single rubber injection molded piece comprising:

a cylindrical body having front and back radial peripheral surfaces, a radial lip on the exterior surface of said cylindrical body near the back radial peripheral surface, a protrusion on the exterior surface of said cylindrical body in front of and connected to said radial lip, a flapper cap in front of said front peripheral surface, said flapper cap being larger than the radially inner cylindrical opening of said cylindrical body whereby said flapper cap can be seated on the cylinder front radial periphery and thereby close off the cylindrical inner opening of said cylinder body, a hinging means for hingedly connecting said flapper cap onto the cylinder front radial periphery surface.

13. The sump system of claim 12 wherein said hinging means comprises a thin radially shaped rubber portion having a notch cut out on both sides thereof and near the flapper cap connection whereby the flapper cap can more easily open and close.

14. The sump system of claim 12 whereby said secondary pump outlet fits inside of said one-way valve cylindrical body entering into said cylindrical body from the back and extending not further than said front radial peripheral surface of said one-way valve cylindrical body whereby said rubber cylindrical body seals from fluid leakage a formed cylindrical conduit extending from the secondary pump outlet travelling through the valve cylindrical body and into said T-fitting.

15. The sump system of claim 14 further comprising a clamping means for providing radially inwardly forces on the T-fitting secondary pump cylindrical end whereby said one-way valve is restrained from axial movement and a seal against fluid leakage is created thereby.

16. In a sump system having a primary and a secondary backup pump, an apparatus comprising:

a T-fitting fluidly connecting the primary pump and secondary pump outlets to a common exhaust, said T-fitting having cylindrically shaped connecting ends, said secondary pump cylindrically shaped connecting end substantially horizontally disposed, a fastening means on the exterior surface of said T-fitting for fastening thereon a water level sensor means for electrically sensing the water level to in turn energize the secondary pump;

a one-way valve within said secondary pump cylindrically shaped connecting end; and wherein the secondary pump connecting end of said T-fitting has a notch disposed within its outermost radial periphery and two longitudinal slots longitudinally shorter than said one-way valve, each slot located radially substantially 90° in opposite radial direction from said notch whereby said longitudinal slots make the secondary pump connecting end radially flexible and whereby said connecting end can be forcibly secured upon said one-way valve.

17. The sump system of claim 16 wherein said fastening means comprises two L-shaped arms facing each other and mounted on the outer cylindrical surface substantially near said T-fitting exhaust outlet generally vertically above said secondary pump connecting end and one hole substantially vertically below said arms and vertically above said secondary pump connecting end for receiving a fastening screw therein.

18. The sump system of claim 16 wherein the one-way valve is a single rubber injection molded piece comprising a cylindrical body having front and back radial peripheral surfaces and a radial outer surface slightly smaller than the inner cylindrical surface of the secondary pump connecting end,
  a radial lip near the cylindrical body back radial peripheral surface extending radially outward from the exterior surface of said cylindrical body whereby when said one-way valve is placed within said secondary pump connecting end of said T-fitting said radial lip is seated against the peripheral edge of the secondary pump connecting end and holds the one-way valve from travelling longitudinally further into said secondary pump connecting end,
  a protrusion on the exterior surface of said cylindrical body near the back radial periphery to be received by said notch,
  a flapper cap in front of said front peripheral surface of said cylindrical body larger than the radially inner cylindrical opening of said cylindrical valve body whereby said flapper cap can be seated on the front radial periphery of said cylinder body and thereby close off the cylindrical inner opening of said cylindrical body,
  a hinging means for hingedly connecting said flapper cap onto said cylindrical body front radial peripheral surface including a radial shaped rubber portion having a notch cut out on both sides thereof and near the flapper cap connection whereby the flapper cap can more easily open and close.

19. The sump system of claim 18 wherein said secondary pump outlet is generally cylindrically shaped and inserted inside of said cylindrical valve body extending into said cylindrical valve body not further than said front radial peripheral surface whereby said rubber cylindrical valve body seals from fluid leakage a formed cylindrical conduit extending from the secondary pump outlet travelling through the valve cylindrical body and into said T-fitting.

20. The sump system of claim 19 further comprising a clamping means for clamping and securing together said secondary pump T-fitting connecting end upon said one-way valve and upon said secondary pump outlet whereby longitudinal movement of the connecting end, the one-way valve and the secondary pump outlet is restrained and a seal against leakage is created thereby.

21. In a sump system having a primary and a secondary backup pump, an article comprising:
  a T-fitting having a primary pump connecting end and a secondary pump connecting end, said T-fitting fluidly connecting the primary pump and the secondary pump outlets to a common exhaust;
  a one-way valve positioned within said T-fitting in the secondary pump connecting end substantially horizontally disposed;
  wherein said T-fitting connecting ends are generally cylindrically shaped and the secondary pump cylindrical connecting end has its axis substantially horizontally disposed;
  a notch located at the outmost radial periphery of said secondary pump cylindrical connecting end; and
  two slots on said secondary pump cylindrical end starting at the outermost radial periphery and extending axially towards said T-fitting, said slots located substantially 180° radially apart from each other and substantially 90° radially distant from said notch, whereby said slots make the outermost periphery of said secondary pump cylindrical end radially flexible.

22. The sump system of claim 21 further comprising a fastening means on the exterior surface of said T-fitting for fastening thereon a water level sensor means for electrically sensing the water level to in turn energize the secondary pump.

23. The sump system of claim 22 wherein the connecting ends of said T-fitting are generally cylindrically shaped and the fastening means comprise two L-shaped arms facing each other and mounted on the outer cylindrical surface of said T-fitting exhaust connecting end, substantially near the outermost periphery of said exhaust connecting end, and one hole, substantially vertically below said arms, for receiving a screw therein.

24. The sump system of claim 21 wherein the one-way valve is a single rubber injection molded piece comprising:
  a cylindrical body having front and back radial peripheral surfaces,
  a radial lip on the exterior surface of said cylindrical body near the back radial peripheral surface,
  a protrusion on the exterior surface of said cylindrical body in front of and connected to said radial lip for communication with said notch;
  a flapper cap in front of said front peripheral surface, said flapper cap being larger than the radially inner cylindrical opening of said cylindrical body whereby said flapper cap can be seated on the cylinder front radial periphery and thereby close off the cylindrical inner opening of said cylinder body; and
  a hinging means for hingedly connecting said flapper cap onto the cylinder front radial periphery surface.

25. The sump system of claim 24 wherein said hinging means comprises a thin radially shaped rubber portion having a notch cut out on both sides thereof and near the flapper cap connection whereby the flapper cap can more easily open and close.

26. The sump system of claim 24 wherein said secondary pump outlet fits inside of said one-way valve cylindrical body entering into said cylindrical body from the back and extending not further than said front radial peripheral surface of said one-way valve cylindrical body whereby said rubber cylindrical body seals from fluid leakage a formed cylindrical conduit extending from the secondary pump outlet travelling through the valve cylindrical body and into said T-fitting.

27. The sump system of claim 26 further comprising a clamping means for providing radially inward forces on the T-fitting secondary pump cylindrical end whereby said one-way valve is restrained fram axial movement and a seal against fluid leakage is created thereby.

* * * * *

UNITED STATES PATENT AND TRADEMARK OFFICE
CERTIFICATE OF CORRECTION

PATENT NO. : 4,631,001

DATED : December 23, 1986

INVENTOR(S) : David W. Keech

It is certified that error appears in the above—identified patent and that said Letters Patent is hereby corrected as shown below:

Claim 1, Col. 6, line 31, insert --,-- after "pump".

Claim 27, Col. 10, line 66, change "fram" to --from--.

Signed and Sealed this

Twenty-first Day of April, 1987

Attest:

DONALD J. QUIGG

Attesting Officer

Commissioner of Patents and Trademarks